US010996966B2

(12) United States Patent
Woodthorpe et al.

(10) Patent No.: US 10,996,966 B2
(45) Date of Patent: May 4, 2021

(54) RECORDING AND RECREATING INTERFACE NAVIGATION PROCESSES BASED ON A WHITELIST GENERATED BY A MACHINE-LEARNED MODEL

(71) Applicant: Synopsys, Inc., Mountain View, CA (US)

(72) Inventors: Nathaniel James Woodthorpe, Ottawa (CA); Benjamin D. Sedat, San Francisco, CA (US); Michael Borohovski, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 133 days.

(21) Appl. No.: 15/909,979

(22) Filed: Mar. 1, 2018

(65) Prior Publication Data
US 2019/0272188 A1    Sep. 5, 2019

(51) Int. Cl.
| G06F 9/48 | (2006.01) |
| G06F 9/455 | (2018.01) |
| G06F 9/451 | (2018.01) |
| G06N 20/00 | (2019.01) |

(52) U.S. Cl.
CPC .......... G06F 9/45512 (2013.01); G06F 9/451 (2018.02); G06N 20/00 (2019.01)

(58) Field of Classification Search
CPC ...... G06F 9/451; G06F 9/45512; G06N 20/00
See application file for complete search history.

(56) References Cited

U.S. PATENT DOCUMENTS

| 2005/0278728 | A1* | 12/2005 | Klementiev | ........ G06F 9/45512 719/328 |
| 2008/0237336 | A1 | 10/2008 | Bates et al. | |
| 2014/0040667 | A1 | 2/2014 | Zemer et al. | |
| 2017/0118167 | A1* | 4/2017 | Subramanya | ......... H04L 61/305 |
| 2017/0134248 | A1 | 5/2017 | Smith et al. | |
| 2018/0165264 | A1* | 6/2018 | Venkataraman | ........ G06F 40/30 |
| 2018/0197103 | A1* | 7/2018 | Petursson | .............. G06N 20/00 |

OTHER PUBLICATIONS

PCT International Search Report and Written Opinion, PCT Application No. PCT/US19/19054, dated May 14, 2019, 12 pages.

* cited by examiner

Primary Examiner — Jennifer N To
Assistant Examiner — K C Chen
(74) Attorney, Agent, or Firm — Fenwick & West LLP

(57) ABSTRACT

A computer system records and recreates an interface navigation process performed by a user with a host system. The computer system observes the user's interactions with the various UI elements during an interface navigation process by using a browser extension for the browser application in which the user is performing the interface navigation process. The browser extension then stores information about the interactions the user is performing and the UI elements that they are being performed on. The browser extension sends the stored interactions to the computer system, which processes the interactions to generate steps of the interface navigation recording. In some embodiments, the computer system also identifies one or more UI elements present in the final UI state of the interface navigation process as "verifiers" that can be used to determine whether the recreation of the interface navigation process is successful.

10 Claims, 4 Drawing Sheets

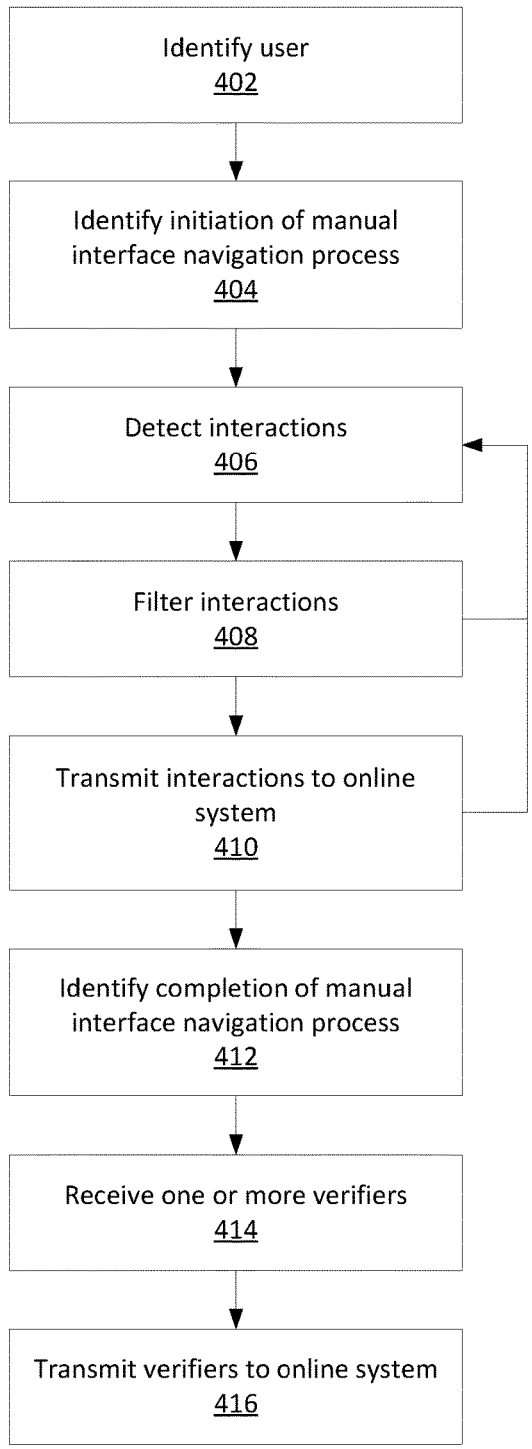
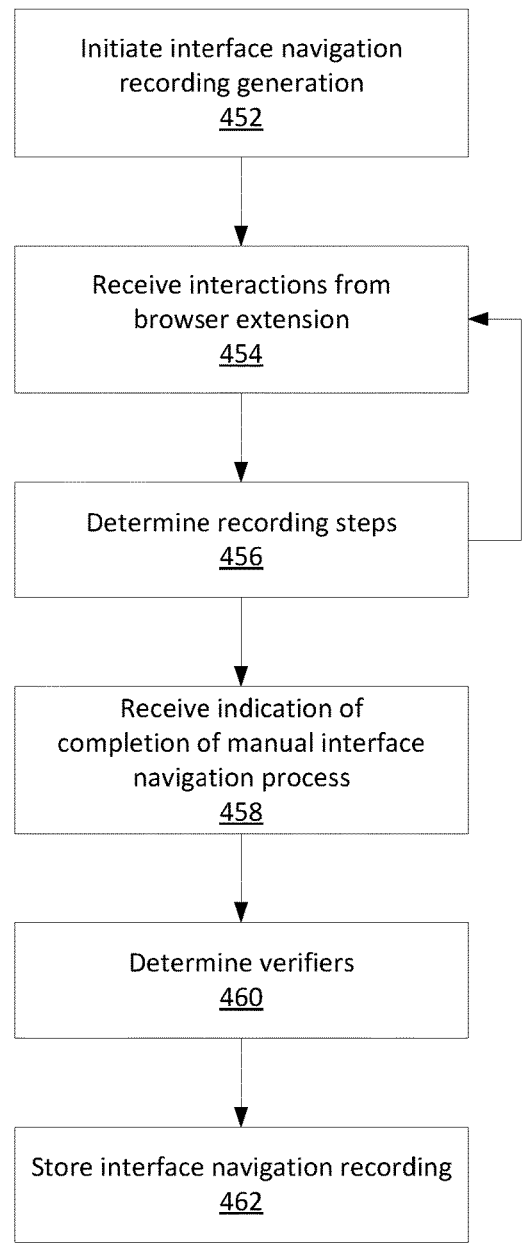
FIG. 4A
FIG. 4B

RECORDING AND RECREATING INTERFACE NAVIGATION PROCESSES BASED ON A WHITELIST GENERATED BY A MACHINE-LEARNED MODEL

BACKGROUND

This disclosure relates generally to navigating user interfaces, and more specifically to automatically recording and recreating interface navigation processes performed by a user.

Users navigate user interfaces (UIs) to communicate with computer systems. By interacting with elements of the a UI, a user can perform particular tasks with the computer system. Some tasks may require that the user interact with multiple UIs or UI "states," which feature a different arrangement of UI elements. The user's navigation through these multiple UI states can be described as an interface navigation process. A computer system may need to replicate a user's interface navigation process to perform services requested by the user. For example, a computer system replicates a user's authentication process when scanning a user's web application for security vulnerabilities.

Collecting the information needed for the computer system to replicate an interface navigation process can be a tedious process that requires significant user involvement. Typically, this information is collected via explicit user designation of actions to transition from states, which is a large burden on the user and has a high risk of user error. Some methods may use network traffic to identify interactions between a device and the host system, but do not effectively capture a user's interactions with a specific UI state.

SUMMARY

A computer system records and recreates an interface navigation process performed by a user with a host system. To do this, the computer system observes the user performing the interface navigation process manually, collects information about their interactions with the host system, and then organizes that information into an "interface navigation recording." The interface navigation recording includes steps that the computer system can execute to recreate the interface navigation process from the perspective of the user.

The computer system uses a browser extension to observe the user's interactions with various UI elements during the interface navigation process in the browser application. The browser extension stores information about the interactions the user is performing and the UI elements on which they are being performed. In some embodiments, the browser extension monitors certain types of interactions or filters the user's interactions to store whitelisted interactions. The browser extension sends the stored interactions to the computer system, which processes the interactions to generate steps of the interface navigation recording. This processing may include further filtering of the interactions and optimizing the interactions before converting them into steps for the recording. In some embodiments, the computer system also identifies one or more UI elements present in the final UI state of the interface navigation process as "verifiers" that can be used to determine whether the recreation of the interface navigation process is successful. The browser extension may also monitor traffic between the browser application and a network (e.g., to the host system) to identify network interactions that occur during the interface navigation process. These network interactions (or derived summaries) may also be sent to the computing system and added to the recording.

By automatically creating the interface navigation recording while the user performs their manual interface navigation process as they would normally, the computer system provides a minimally intrusive way for the system to capture the interface navigation process. In some cases, recreating the interface navigation process based on interactions with UI elements is more robust than conventional methods that rely on network traffic alone and more reliably mimics the same browser behavior.

BRIEF DESCRIPTION OF THE DRAWINGS

Figure (FIG. 1 illustrates a computer system recording and replaying an interface navigation process, according to one embodiment.

FIG. 4A is a flowchart of a method for monitoring a manual interface navigation process, according to one embodiment.

FIG. 4B is a flowchart of a method for generating an interface navigation recording, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
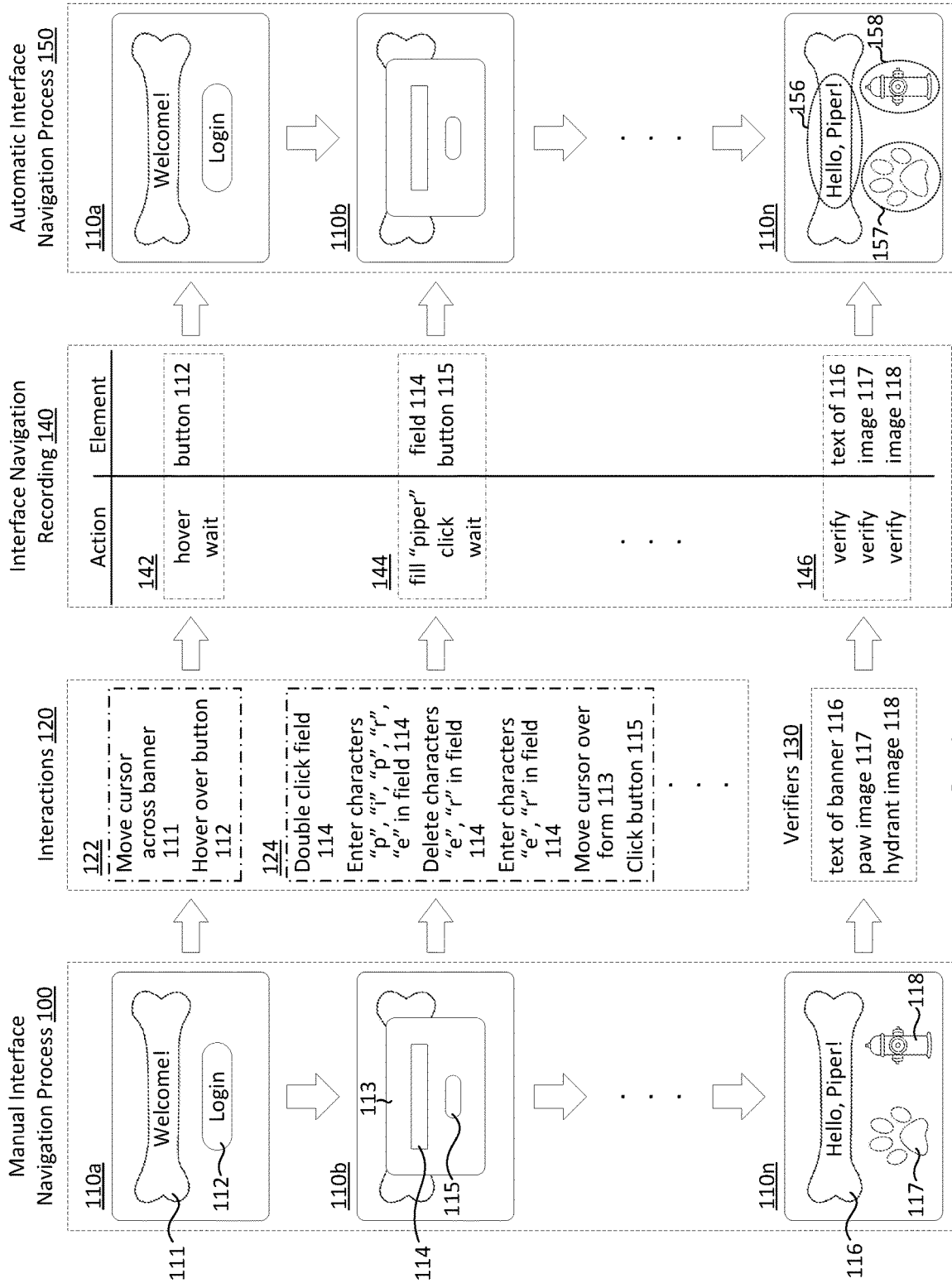

FIG. 1 illustrates the automated recording and playback of an interface navigation process, according to one embodiment. The term "interface navigation process" describes one or more transitions between a plurality of user interface (UI) states (e.g., from an initial UI state through any intermediate UI states, if any, to a final UI state) driven by a set of interactions. Performance of particular interactions in one UI state triggers a transition to another UI state, and an interface navigation process is the combination of these triggers and transitions through the UI states. As discussed further in FIG. 2, these UI states may be presented by a browser application on a display to a user as the browser application accesses a host system and displays content according to instructions from the host system. These UI states may thus be determined by instructions from the host system that may be provided on one or more pages accessed on the host system.

An interface navigation process can be performed manually (i.e., by a user), or automatically (i.e., by a computer). The interactions that occur during a manual interface navigation process can be "recorded" as they are being performed to automatically create an "interface navigation recording." The interface navigation recording stores steps that are used to recreate the interactions that trigger transitions from the manual navigation process. An automatic interface navigation process is then performed by applying the interface navigation recording to the UI states.

In the example manual interface navigation process 100 of FIG. 1, the user navigates from an initial UI state 110a through at least one intermediate UI state 110b to a final UI state 110n. Each UI state 110 has an arrangement of UI elements that are presented to the user and with which the user may interact to transition to the next UI state 110. A UI element is a constituent displayable component of the user's display. These may include graphical elements, interface forms, buttons, and other components displayed for a user in the display. UI elements typically differ from one UI state to another. UI state 110a has a banner UI element 111 that reads "Welcome!" and a button UI element 112 that reads "Login." UI state 110b includes a form popup UI element 113 with field UI element 114 and a button UI element 115. UI state 100n includes a banner UI element 116 that reads "Hello, Piped", a paw image UI element 117, and a hydrant image UI element 118.

While the user interacts with the user interface states 110, these interactions 120 are automatically detected. In initial UI state 110a, interactions 122 ("move cursor across banner 111" and "hover over button 112") are detected before initial UI state 110a transitions to intermediate UI state 110b. In intermediate state 110b, interactions 124 ("double click field 114," "enter characters 'p', 'i'm 'p', 'r', 'e' in field 114," "delete characters 'e', 'r' in field 114," "enter characters 'e', 'r' in field 114," "move cursor over form 113," and "click button 115") are detected before the intermediate UI state 110b transitions to the final UI state 110n. By passively monitoring the interactions 120 performed by the user, triggers can be determined with minimal disturbance to the user's normal manual interface navigation process 100.

Verifiers 130 are detectable aspects of the final UI state 110n that are present when the manual interface navigation process 100 has been successful and can be used to verify or signify that the interface has reached the final UI state 110n. These detectable aspects can include UI elements and network traffic, such as web server headers, query strings, or requests. An example of a UI element verifier is a "Welcome" banner that only appears after an authentication interface navigation process has been completed. In this example, the verifiers 130 are the "Hello, Piper!" text of banner 116 (which is otherwise the same as banner 111), the paw image 117, and the hydrant image 118. These verifiers maybe identified by the user or determined automatically The interface navigation recording 140 includes recording steps 142-146, which are generated based on the interactions 120 and verifiers 130 collected from the manual interface navigation process 100. In the example shown, the recording steps 142-146 are in an "action-element" format where each step specifies an action that takes place on a UI element and effectuate the transitions between UI states. In one embodiment, UI elements are identified by a XPath or CSS selector. Recording steps 142 ("hover [over] button 112" and "wait") are determined based on the interactions 122 detected in UI state 110a. Recording steps 144 ("fill 'piper' [in] field 114," "click [on] button 115" and "wait") are determined based on the interactions 124 detected in UI state 110b. Recording steps 146 ("verify [presence of] text of [banner] 116," "verify [presence of] image 117," and "verify [presence of] image 118") are determined based on the verifiers 130 from UI state 110n.

The recording steps 142-144 may be optimized by removing or combining inconsequential or redundant steps. In many cases, not all of the interactions performed during the manual interface navigation process are required to recreate the manual interface navigation process. For example, though the user may need to move their cursor from one UI element to another UI element or select a field to access a particular UI element, those interactions themselves may be omitted without affecting the manual interface navigation process 100. Because of this, the recording steps 142-144 differ from the interactions 122-124 on which they are based. Specifically, the "move cursor across banner 111" interaction 122, "double click field 114" interaction 124, and "move cursor over form 113" interaction 124 are omitted from the recording steps 142-144 of the interface navigation recording 140 because they were deemed to be inconsequential. Additionally, the "enter characters . . . ," "delete characters . . . ," and "enter characters . . . " interactions 124 are combined into a single "fill 'piper' [in] field 114" recording step 144 because they likely represent a typographical error and correction by the user.

Additional recording steps 142-146 may also be added to the interface navigation recording 140. For example, "wait" steps are added to navigation steps 142-144 to compensate for differences in human and computer execution (such as the "wait" UI flow steps 142 and 144). Additionally, verifiers may be incorporated into the interface navigation recording 140 in the form of "verify" recording steps 146 that are added to the interface navigation recording 140 despite not being based on interactions 120 performed by the user during the manual interface navigation process 100 to account for the verifiers 130. In one embodiment, verifiers are stored as element IDs, such as XPath or CSS selectors.

The automatic interface navigation process 150 performed based on the interface navigation recording 140 recreates the manual interface navigation process 100, sharing the same initial, intermediate, and final UI states 110a-n as the manual interface navigation process 100. The success of the automatic navigation process 150 is confirmed by the "verify" recording steps 146 that check areas 156-158 of the final UI state 110n for the presence of the corresponding verifiers 116-118.

System Architecture

Figure 2:
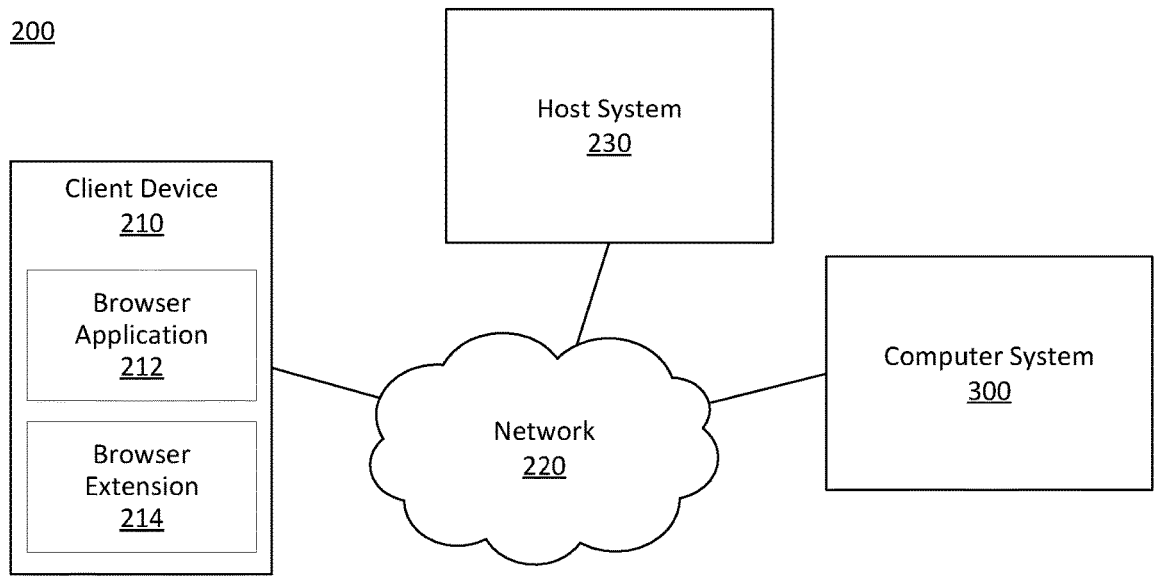
FIG. 2 is a block diagram of a system environment for a computer system, according to one embodiment.

FIG. 2 is a block diagram of a system environment 200 for a computer system 300 capable of recording a manual interface navigation process, according to one embodiment. The system environment 200 comprises one or more client devices 210, a network 220, one or more host systems 230, and the computer system 300. In alternative configurations, different and/or additional components may be included in the system environment 200. In one embodiment, the computer system 300 is a security system capable of scanning host systems 230 for security vulnerabilities.

In the system environment 200, a user of a client device 210 communicates with a host system 230 via a network 220 by performing interactions in a browser application 212 on the client device 210. During a manual interface navigation process, the browser extension 214 on the client device 210 monitors the interactions performed and relays them to the computer system 300. The computer system 300 then creates an interface navigation recording based on the received interactions. The computer system 300 may then store and later use the interface navigation recording to recreate the user's manual interface navigation process as an automatic navigation process. In another embodiment of the system environment 200, there is no network 220, and the host system 230 and computer system 300 are embodied on the client device 210, allowing the interface navigation recording to be generated locally on the client device 210.

The client devices 210 are one or more computing devices capable of receiving user input and communicating data with the host system 230 and the computer system 300 via the network 220. In one embodiment, a client device 210 is a conventional computer system, such as a desktop or a laptop computer. Alternatively, a client device 210 may be a device having computer functionality, such as a smartphone.

The client device 210 includes a browser application 212 and a browser extension 214. The browser application 212 is an application running on the client device 210 that allows the user of the client device 210 to interact with the host system 230 or computer system 300. In one embodiment, the browser application 212 is a web browser. The browser application 212 specifically presents UI states (e.g., of the host system 230) to the user and facilitates user interactions that enable the user to navigate between the UI states. Browser applications 212 often use "sandboxes" to isolate programs or information within the browser application 212, or within tabs or pages of the browser application 212. That is, information within a sandbox cannot be accessed by programs or systems (like the computer system 300) outside of the sandbox. The browser extension 214 is provided by the computer system 300 and may access the sandbox by executing within the browser application 212. The browser extension 214 collects information about the UI states presented and interactions performed in the browser application 212. In one embodiment, the browser extension 214 is an add-on module or plugin loaded with the browser application 212. In this embodiment, the browser application 212 may run the browser extension 214 as a sub-process with privileges to interact with pages displayed in the browser application 212 or to monitor network traffic.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more host systems 230 are coupled to the network 220 for communicating with the one or more client devices 210. A host system 230 can include one or more servers capable of communicating data with the client devices 210 and the computer system 300. The host system 230 may host interfaces, websites, or web applications used by users of the client devices 210. In one embodiment, the host system 230 is a third-party system that is separate from the computer system 300.

Users of client devices 210 perform interface navigation processes with the host system 230. Within a given host system 230, users can navigate between different UI states based on their interactions with the UI states. That is, the interactions a user performs control how the user navigates the host system 230. Thus, the particular sequence of UI states and the corresponding interactions form an "interface navigation process."

An example interface navigation process is an authentication process. The host system 230 may require that users complete an authentication process before they are permitted to access certain functionality of the host system 230. Such an authentication process may require that the user provide login credentials on a login page of the host system 230 to get to a welcome page of the host system 230. In that case, the login page is an initial UI state, entering the credentials would be interactions that trigger a transition from the initial UI state, and the welcome page would be the final UI state.

The computer system 300 works with the browser extension 214 to automatically generate an interface navigation recording for a host system 230 by observing a manual interface navigation process 100 performed in the browser application 212 of a client device 210. The user's interactions with the host system 230 in the browser application 212 of the client device 210 are monitored and stored as an interface navigation recording that can be used to produce an automatic interface navigation process that recreates the observed manual interface navigation process. The interactions may be filtered or optimized so that interactions that are irrelevant to the manual interface navigation process are removed. In the embodiment discussed below, the interactions are monitored and filtered by the browser extension 214, and the interface navigation recording is generated by the computer system 300. However, in other embodiments, the described functionality may be distributed between the browser extension 214 and the computer system 300. For example, the interactions may be filtered by the computer system 300 or the interface navigation recording may be generated by the browser extension 214 on the client device 210.

Figure 3A:
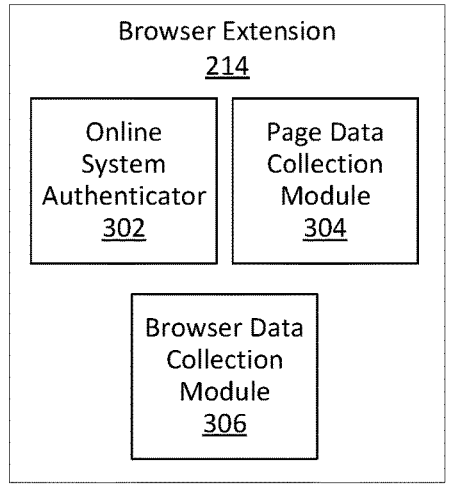
FIG. 3A is a block diagram of a browser extension of a client device, according to one embodiment.

FIG. 3A is a block diagram of the browser extension 214 on a client device 210, according to one embodiment. The browser extension 214 observes interactions between the user and the host system 230 in the browser application 212 and sends information about those interactions to the computer system 300. The browser extension 214 is shown with specific functionality separated into different modules—a computer system authenticator 302, a page data collection module 304, and a browser data collection module 306. However, this separation is just for the purposes of explanation, and may not be reflective of the organization of the browser extension 214 (e.g., a single module of code). In other embodiments, the browser extension 214 may perform additional, fewer, or different functions for various applications.

The browser extension 214 determines when the manual interface navigation process is being performed by the user based on indications provided by the user. Specifically, the user indicates to the browser extension 214 when they are beginning the manual interface navigation process (e.g., immediately before) and when they have completed performing the manual interface navigation process. The browser extension 214 may facilitate receipt of these indications via interface buttons provided by the browser extension 214 (e.g., overlaid on the page displayed in the browser application 212).

In some embodiments, the browser extension 214 determines the user's identity before recording the manual interface navigation process. In these embodiments, the browser extension 214 includes a computer system authenticator 302 that determines the identity of the user of the client device 210. To do this, the computer system authenticator 302 communicates with the computer system 300 to perform an authentication process based on user information stored in the user store 310 of the computer system 300. For example, the computer system authenticator 302 may match an API key, username, or password submitted by the user to known user information associated with a user identifier in the user store 310. User identity is further discussed in conjunction with FIG. 3B.

The page data collection module 304 of the browser extension 214 observes and collects information about interactions between the user of the client device 210 and the host system 230. In one embodiment, the page data collection module 304 injects code, for example in JAVASCRIPT®, or another programming language, into the page of the host system 230 accessed in the browser application 112. The browser application 212 may prevent the browser extension from directly accessing user interactions (or other page context relevant to the recording) with UI states. Rather than directly receiving or accessing the user accesses, the injected code may modify the page to report interactions with UI elements. The injected code thus allows the page data collection module 304 to access the interactions the user performs on the page by modifying UI elements on the page to inform the browser extension 214 of any interactions performed on the modified UI elements. As one example, the injected code modifies a text box UI element to inform the browser extension 214 when a user interacts with the text box UI element, such as keyboard inputs to the text box UI element. About any key presses it receives. In some configurations, a subset of the UI elements present on the page are modified to inform the browser extension 214 about their interactions. The subset may be based on the type of UI element present in a UI state and selected based on the likelihood or expected user interaction with the UI element. For example, specific types of UI elements (e.g., text boxes, buttons, links) may be more likely to be involved in the interface navigation process and thus chosen to be modified instead of other types of UI elements (e.g., images, non-input controls) that are less likely to be involved in the interface navigation process. In addition, the types of user interactions that are captured by the injected code may also be dependent on the type of UI element. For example, a text box element may be configured to report textual input, while a "button" may be modified to report a click or other pointing device action. The page data collection module 304 may also collect information about the UI states themselves, such as the identity, content and placement of UI elements within the UI states.

Though the page data collection module 304 may have access to all of the interactions performed within the page, it may identify a subset of those interactions as more significant to the recording process than others. For example, particular types of interactions (e.g., input, and clicks) or interactions associated with particular UI elements (e.g., buttons and links) may be more likely to be relevant to the manual interface navigation process than other types of interactions or those associated with other UI elements. The page data collection module 304 may process all interactions to identify them and then only capture those determined to be significant. The subset of interactions to capture can be determined based on a whitelist, which may itself be hard coded or determined via machine learning. In one embodiment, the machine learning model whitelists interface interactions that are commonly used in interface navigation recordings. In another embodiment, the machine learning model additionally or alternatively whitelists interface interactions that uncommon relative to a learned or expected frequency of occurrence for those types of interactions. Both machine learning models are trained on data from previous interface interaction and interface navigation recording data.

In some embodiments, the page data collection module 304 additionally collects timing data. For example, the page data collection module 304 may store timestamps or durations (e.g., a time period between the previously recorded interface interaction and the current interface interaction) for recorded interface interaction. Timing data may be stored for every interface interaction that is recorded or only for a subset of the recorded interface interactions (e.g., only clicks).

In one embodiment, the page data collection module 304 prompts the user to identify verifiers in the final UI state of the manual interface navigation process. The final UI state of the manual interface navigation process can be determined based on when the user indicates that they have completed the manual interface navigation process. That is, the final UI state is the UI state present when the manual interface navigation process is completed. In another embodiment, the page data collection module 304 stores information about the final UI state and one or more of the initial and intermediate UI states of the manual interface process. This information identifies UI elements present in the UI states and may also specify their content and placement (relative to each other or the UI state as a whole). Verifier determination is further discussed in conjunction with the verification module 316 of the computer system 300 of FIG. 3B.

In some embodiments, the browser extension 214 includes a browser data collection module 306 to collect information about network interactions between the browser application 212 and the host system 230. This information may capture interactions such as redirects, browser accesses to other domains or systems related to the host system 230 (e.g., from a page associated with the host system 230), and other network traffic. In one embodiment, the browser extension 214 captures network interactions by intercepting the interactions as they are being sent from and received by the browser application 212. In another embodiment, the browser extension 214 queries APIs within the browser application 212 to collect information about these interactions.

The browser extension 214 may additionally collect metadata about interactions, such as what type of network protocol was used to transfer the data. For example, the browser extension 214 may observe that some data (e.g., passwords) are encrypted via HTTP Secure (HTTPS) before being sent to the host system 230. This observation can then be used to ensure that data is properly secured during the automatic interface navigation process.

Data collected by the browser extension 214 during the manual interface navigation process is stored in a data buffer before it is sent to the computer system 300. As discussed above, this data can include user interactions within the page, verifiers, user feedback, redirection requests, and network traffic. The data buffer may periodically synchronize with the process data store 312 of the computer system 300 to transfer its data. In some embodiments, the data buffer only transfers a portion of its stored data to the process data store 312. For example, the browser extension 214 may capture every interaction that is performed by the user during the manual interface navigation process but perform filtering to identify significant interactions. In this case, every captured interaction is stored in the data buffer, but only the filtered interactions are transferred to the process data store 312. The data buffer deletes the stored data once it has been transferred to the process data store 312.

In some embodiments, the browser extension 214 presents feedback to the user from the computer system 300 during or after the manual interface navigation process. The presented feedback is used to resolve errors (or potential errors) that arise with the interface navigation recording. Feedback is further discussed in conjunction with the feedback module 322 of FIG. 3B.

Additionally, processing discussed below as occurring on the computer system 300 may be performed on the interaction data by the browser extension 214 before it is sent to the computer system 300. For example, the interface navigation recording may be generated locally by the browser extension 214 before being sent to the computer system 300.

Figure 3B:
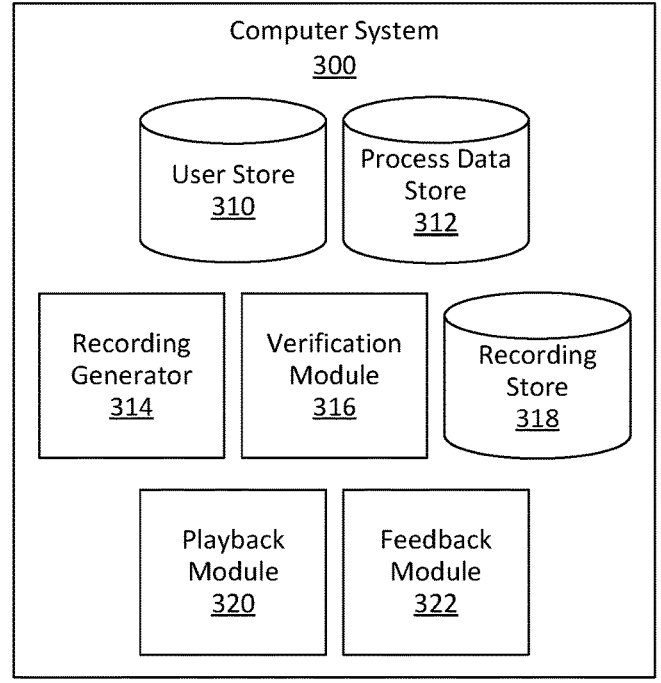
FIG. 3B is a block diagram of a computer system, according to one embodiment.

FIG. 3B is a block diagram of the computer system 300, according to one embodiment. The computer system 300 receives information about the manual interface navigation process 100 from the browser extension 214 and generates an interface navigation recording based on that information. The computer system 300 includes a user store 310, a process data store 312, a recording generator 314, a verification module 316, a recording store 318, a playback module 320, and a feedback module 322. In other embodiments, the computer system 300 may include additional, fewer, or different components for various applications. For example, the computer system 300 may additionally include a web server that serves web pages and manages its connection to the network over which it communicates with the client device 210 or the host system 230. Conventional components such as network interfaces, security functions, load balancers, failover servers, management and network operations consoles, and the like are not shown so as to not obscure the details of the system architecture.

The user store 310 is a database that stores information about users of the computer system 300. User information may include user identifiers, authentication credentials, associated host systems 230, and existing or previous interface navigation recordings. A user is associated with a domain or subdomain of a host system 230 if they have previously recorded manual interface navigation processes for or otherwise interacted with the computer system 300 regarding that host system 230.

The process data store 312 is a data store that stores information about the manual interface navigation process received from the browser extension 214. This information can include UI state descriptions, interface interactions, network interactions, verifiers, and feedback responses collected by the browser extension 214.

The recording generator 314 processes the information from the process data store 312 to generate an interface navigation recording with steps to recreate the manual interface navigation process. Interactions from the manual interface navigation process are turned into executable steps that can be performed by the computer system by the recording generator 314. Interface interactions may be expressed as actions to be performed on particular UI elements. Network interactions may be expressed as network traffic that is expected to be generated or received by the browser application 212 during the interface navigation process. For example, a network interaction may be incorporated into the interface navigation recording as a step to confirm data is being sent to or received from the correct source. Network interactions may also include a timestamp, token, nonce, or other content that will differ in another navigation of the user interfaces. By filtering out these mutable parameters (e.g. by performing the recording multiple times and comparing the network interactions generated against the recorded network interactions) the system can increase the accuracy in determining that the recording was successful.

The recording generator 314 may filter the interactions in addition to or instead of filtering performed on the interactions by the browser extension 214. The filtering is performed based on comparison to a whitelist, which may be hard coded or developed via machine learning techniques discussed in conjunction with the page data collection module 304 of FIG. 3A. In some embodiments, the recording generator 314 additionally optimizes the interactions. Similar interactions (e.g., key inputs, or clicks) within a certain timeframe or a single UI state can be grouped together. Some of these interactions may then be removed or combined. For example, an "enter <character>" interface interaction may be canceled out by an immediately subsequent "delete <character>" interface interaction. For network interactions, as discussed below, these interactions may also be generalized when added to the recording.

The recording generator 314 also accounts for the differences in human execution and computer execution by adding "wait" steps. Waits may be added in between interactions to increase the likelihood that the interaction has been completed and received by the host system 230. Waits may additionally or alternatively be added in between UI state transitions to increase the likelihood that the UI state transition has been completed before additional interactions take place. The durations of the wait steps may be a standardized value determined by the computer system 300 (e.g., milliseconds), or values determined based on timing information from the manual interface navigation process. For example, the time period between a first interaction and a second interaction, as observed during the manual interface navigation process, could be used as the wait value for the first interaction.

The recording generator 314 also revises existing interface navigation recordings, such as when they have been determined to be unsuccessful. If that is the case, the recording generator 314 may back out some of the changes it made during the processing described above. For example, steps removed due to filtering or optimization may be added back into the interface navigation recordings, or standardized wait time durations may be replaced with durations based on the manual interface navigation process. Additionally, changes (e.g., corrections) are made in response to user feedback discussed below.

The verification module 316 determines mechanisms (e.g., verifiers) by which the computer system 300 can determine whether the automatic interface navigation process recreated from the interface navigation recording has been successful. These may be associated with or added to the recording. The user may explicitly select verifiers from the final UI state at the end of the manual interface navigation process via the browser extension 214. Alternatively, the verification module 316 can automatically identify verifiers for the final UI state by comparing the UI elements present in the final UI state with those present in earlier UI states, such as the initial or penultimate UI states. In one embodiment, the verification module 316 uses a machine-learned model trained on other interface navigation processes or interface navigation recordings to automatically identify verifiers.

In some embodiments, the computer system 300 does not explicitly verify that the automatic interface navigation process has been success and thus does not include a verification module 316.

The recording store 318 is a data store that stores interface navigation recordings that have been generated by the computer system 300. Each interface navigation recording includes identifying information, such as user, domain (or host system 230), and type of recording (e.g., authentication, shopping cart). Recording types may be tied to the function the interface navigation process performs within the host system 230. The identifying information may also include the time when the manual interface navigation process on which the interface navigation recording was based was performed by the user, and the browser application 212 that the manual interface navigation process was performed in. Additionally, the interface navigation recording includes a plurality of steps that are executable by the computer system 300 to perform interactions with the host system 230. For example, each step may specify an action to be taken on a UI element. The UI state in which the step should be performed may also be included. In some embodiments, verifiers are included in the interface navigation recording as steps formatted similarly to the other steps. In other embodiments, the verifiers are included in a separate section of the interface navigation recording.

The playback module 320 performs an automatic interface navigation process with the host system 230 based on the interface navigation recording. In one embodiment, the playback module 320 executes the steps of the interface navigation recording using scripted commands and JAVASCRIPT®. Recording playback is performed in accordance with method 500 of FIG. 5.

During automatic playback, the playback module 320 may also use the verifiers, and optionally the network interactions, to verify whether the automatic interface navigation process as a whole, or particular steps, successfully completed. This may be confirmed by the verifiers in the final UI state, as well as similarity of the network interactions generated during the automatic interface navigation process.

The playback module 320 may verify success by confirming that the verifiers in the interface navigation recording also appear during the automatic interface navigation process in the expected UI states. In some examples, the playback may be considered successful even if fewer than all of the verifiers are present.

In addition or as an alternative, the playback module 320 determines that the automatic interface navigation process has been unsuccessful if a threshold number (e.g., one) of "negative-verifiers," or UI elements that are only present in the initial state, are found in the final UI state. Negative-verifiers can be similarly be determined through explicit user identification or automatic identification by the computer system 300 based on comparison of the initial UI state to subsequent UI states. For example, encountering a login form or button UI element in the final UI state of an authentication process likely indicates that the authentication process was unsuccessful.

To confirm that the network interactions are successful, the network interactions in the recording may be generalized relative to the specific interactions. In some embodiments, the network interactions are generalized when added to the interface navigation recording. Since the network interactions may be particular to a certain connection or interface navigation, rather than expecting an identical match relative to the network interactions in the recording, the generalization analyzes whether the network interactions created during the automatic interface navigation are of the similar type or kind to those of the recording. For example, rather than expecting the same timestamp or token in a network interaction, the automatic interface navigation process may expect any timestamp or token.

Accordingly, in various configurations, the playback module can be configured not to verify the automatic interface navigation process, or to verify it with a combination of verifiers, negative-verifiers, and network interactions.

The feedback module 322 prompts and receives user feedback to facilitate generation of an accurate interface navigation recording. The feedback module 322 may query the user to resolve ambiguities. For example, a query for the recording process shown in FIG. 1 could be "Did you mean to type 'piper'?" to confirm that the typing, deleting, and retyping steps were unintentional and can be combined. Similarly, a query could include confirmation that particular interface interactions were intentional and thus potentially significant (instead of mistakes). The feedback module 322 may also notify the user if replay of the recording by the playback module 320 did not successfully complete the automatic interface navigation process. The feedback module 322 may then prompt the user to take corrective action that allows the computer system 300 to generate a successful interface navigation recording. For example, the user may repeat the entire manual interface navigation process or a portion of the manual interface navigation process.

In one embodiment, the feedback module 322 provides the user with a visual representation of an automatic interface navigation process performed by the computer system 300 based on the interface navigation recording. The visual representation may be a video, photo, or screenshot of one or more UI states or interactions from the automatic navigation process. For example, a video representation may include both the UI states being navigated through and the interactions performed by the computer system 300 during the automatic navigation process, while a screenshot may show a single UI state of the automatic interface navigation process after a particular interaction has been performed. Upon viewing the visual representation, the user can confirm that the automatic interface navigation process is correct, or notify the computer system 300 that the automatic interface navigation process is incorrect, either partially or in its entirety.

A visual representation provides a way for the user to see how the computer system 300 recreates their manual interface navigation process and potentially identify errors in how the manual interface navigation process was translated into an interface navigation recording. Based on the visual representation, the user may perform the entire manual interface navigation process again, or selectively correct portions of the automatic interface navigation process from the visual representation. For example, the user may notice that the automatic interface navigation process interacts with the wrong UI element in the second UI state, leading to a transition to an incorrect third UI state and ultimately an incorrect final UI state. The user can note that the performed interface interaction (i.e., the interaction on the wrong UI element) is incorrect and provide the correct interface interaction (i.e., clicking on a different UI element), which the computer system 300 incorporates into a revised interface navigation recording. The user can then view a visual representation of a second automatic interface navigation process based on the revised interface navigation recording.

This feedback mechanism gives the user the option to only correct the portions of the interface navigation recording that are incorrect.

Method for Recording a Manual Interface Navigation Process

FIG. 4A is a flowchart of a method 400 by the browser extension 214 for monitoring a manual interface navigation process, according to one embodiment. In some embodiments, the browser extension 214 first identifies 402 the user, such as by checking their authentication credentials with the computer system 300. The user identity can be used to streamline the recording process setup, such as by allowing the user to specify that their manual interface navigation process is for one of their associated host systems 230, rather than having the user explicitly enter the identity of the host system 230 or requiring the computer system 300 to determine the identity of the host system 230. The user identity may also be used to confirm that the user is authorized to create an interface navigation recording for the host system 230 and that the recording is associated only with the user's information hosted in the host system 230.

The browser extension 214 identifies 404 the initiation of the user's manual interface navigation process, such as through an explicit indication received from the user. As the manual interface navigation process is performed, the browser extension 214 continuously detects 406 interactions as they are performed. In embodiments, the interactions are also filtered 408 as they are detected 406. The interactions are transmitted 410 to the computer system 300. In one embodiment, this occurs in substantially real-time (i.e., soon after the interaction is detected), but in others, interactions are buffered before they are transmitted 410. In another embodiment, interactions may not even be transmitted 410 to the computer system 300 until the end of the manual interface navigation process.

After the browser extension 214 has detected all of the interactions from the manual interface navigation process, it identifies 412 the completion of the manual interface navigation process, such as through another explicit indication received from the user. In some embodiments, the browser extension 214 may prompt the user for and then receive 414 one or more verifiers, which are then transmitted 416 to the computer system 300.

FIG. 4B is a flowchart of a method 450 by the computer system 300 for generating an interface navigation recording based on a monitored manual interface navigation process, according to one embodiment. The computer system 300 initiates 452 the generation of the interface navigation recording, generally in response to the browser extension's 214 identification 404 of the initiation of the manual interface navigation process. As they are transmitted 410 from the browser extension 214, interactions from the manual interface navigation process are received 454 by the computer system 300 and used to determine 456 recording steps. This process may occur continuously until the computer system 300 receives 458 an indication of completion of the manual interface navigation process from the browser extension 214. Then, if applicable, the computer system 300 identifies verifiers for the manual interface navigation process, either by receipt of user-specified verifiers transmitted 416 by the browser extension 214, or by its own determination based on the final UI state of the manual interface navigation process. The verifiers are incorporated into the interface navigation recording. Finally, the interface navigation recording is stored 462 in the computer system 300.

Method for Playing Back an Interface Navigation Recording

Figure 5:
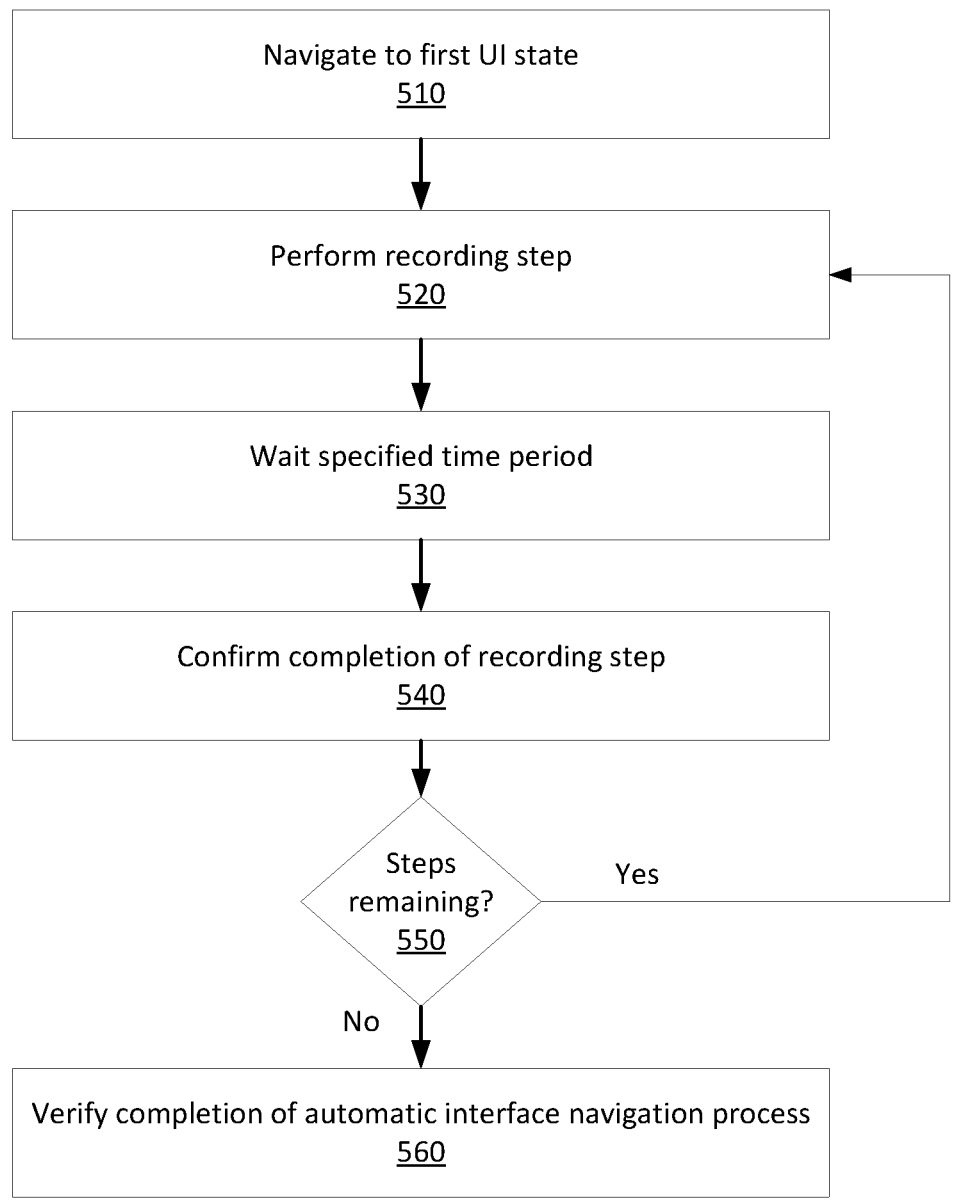
FIG. 5 is a flowchart of a method for performing an automatic interface navigation process based on an interface navigation recording, according to one embodiment.

FIG. 5 is a flowchart of a method 500 for performing an automatic interface navigation process based on an interface navigation recording, according to one embodiment. The computer system 300 first navigates 510 to the first UI state of the interface navigation recording, which may be specified by a domain or subdomain of a host system 230 included with the interface navigation recording. The computer system 300 then performs 520 the first recording step, and waits 530 for the specified time period. In some embodiments, the computer system 300 confirms 540 the completion of the recording step. After the step has been completed, the computer system 300 determines 550 whether there are remaining steps of the interface navigation recording to complete. If so, the computer system 300 proceeds to the performs 520 the next step, waits 530, and confirms 540 (if applicable). This cycle continues until no further steps remain. Finally, the computer system 300 verifies 560 the completion of the automatic interface navigation process.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving, by a computer system, information describing a plurality of interactions between a user and one or more user interface (UI) elements from a manual interface navigation process performed by the user, the manual interface navigation process comprising navigation amongst a plurality of UI states of a host system, the navigation starting at an initial UI state of the plurality of UI states and ending at a final UI state of the plurality of UI states;
    filtering the plurality of interactions to remove irrelevant interactions from the manual interface navigation process based on a whitelist, wherein the whitelist is generated by a machine-learned model trained on information about previously generated interface navigation recordings;
    determining, by the computer system, one or more steps of an interface navigation recording based on the filtered plurality of interactions, each of the one or more steps being executable by the computer system to recreate at least one interaction from the plurality of interactions with a UI state of the plurality of UI states of the host system;
    storing the interface navigation recording at the computer system;
    performing, by the computer system, an automatic interface navigation process by executing the one or more steps of the interface navigation recording, the automatic interface navigation process recreating the navigation amongst the plurality of UI states of the host system of the manual interface navigation process;
    identifying, by the computer system, a final UI state of the manual interface navigation process and a prior UI state of the manual interface navigation process from the plurality of UI states of the manual interface navigation process;
    automatically selecting, by the computer system, a set of verifiers by comparing UI elements that are present in the final UI state of the manual interface navigation process to UI elements that are present in the prior UI state of the manual interface navigation process; and
    automatically verifying, by the computer system, based on a final UI state of the automatic interface navigation process and the one or more determined verifiers, whether the automatic interface navigation process successfully completed.

2. The method of claim 1, wherein determining the one or more steps comprises optimizing the plurality of interactions, the optimization reducing the number of interactions based on which the steps are generated.

3. The method of claim 1, further comprising:
    receiving, from the user, a correction to at least one of the generated steps; and
    revising the interface navigation recording based on the received correction.

4. The method of claim 1, wherein the plurality of interactions is a subset of all of the interactions performed by the user in the manual interface navigation process.

5. The method of claim 1, further comprising:
    determining that the automatic navigation process was unsuccessful by detecting one or more negative-verifiers in the final UI state of the automatic interface navigation process, each of the one or more negative-verifiers being a UI element found in the initial UI state of the manual interface navigation process.

6. A non-transitory computer-readable medium comprising instructions that when executed by a processor cause the processor to:
    receive, by a computer system, information describing a plurality of interactions between a user and one or more user interface (UI) elements from a manual interface navigation process performed by the user, the manual interface navigation process comprising navigation amongst a plurality of UI states of a host system, the navigation starting at an initial UI state of the plurality of UI states and ending at a final UI state of the plurality of UI states;
    interface navigation process based on a whitelist, wherein the whitelist is generated by a machine-learned model trained on information about previously generated interface navigation recordings;
    determine, by the computer system, one or more steps of an interface navigation recording based on the filtered plurality of interactions, each of the one or more steps being executable by the computer system to recreate at least one interaction from the plurality of interactions with a UI state of the plurality of UI states of the host system;
    store the interface navigation recording at the computer system;
    perform, by the computer system, an automatic interface navigation process by executing the one or more steps of the interface navigation recording, the automatic interface navigation process recreating the navigation amongst the plurality of UI states of the host system of the manual interface navigation process;
    identify, by the computer system, a final UI state of the manual interface navigation process and a prior UI state of the manual interface navigation process from the plurality of UI states of the manual interface navigation process;
    automatically select, by the computer system, a set of verifiers by comparing UI elements that are present in the final UI state of the manual interface navigation process to UI elements that are present in the prior UI slate of the manual interface navigation process; and
    automatically verify, by the computer system, based on a final UI state of the automatic interface navigation process and the one or more determined verifiers, whether the automatic interface navigation process successfully completed.

7. The non-transitory computer-readable medium of claim 6, wherein the instructions to determine the one or more steps cause the processor to:
    optimize the plurality of interactions, the optimization reducing the number of interactions based on which the steps are generated.

8. The non-transitory computer-readable medium of claim 6, wherein the instructions further cause the processor to:

receive, from the user, a correction to at least one of the generated steps; and revise the interface navigation recording based on the received correction.

9. The non-transitory computer-readable medium of claim 6, wherein the plurality of interactions is a subset of all of the interactions performed by the user in the manual interface navigation process.

10. The non-transitory computer-readable medium of claim 6, wherein the instructions further cause the processor to:

determine that the automatic navigation process was unsuccessful by detecting one or more negative-verifiers in the final UI state of the automatic interface navigation process, each of the one or more negative-verifiers being a UI element found in the initial UI state of the manual interface navigation process.

* * * * *